Figure 1:
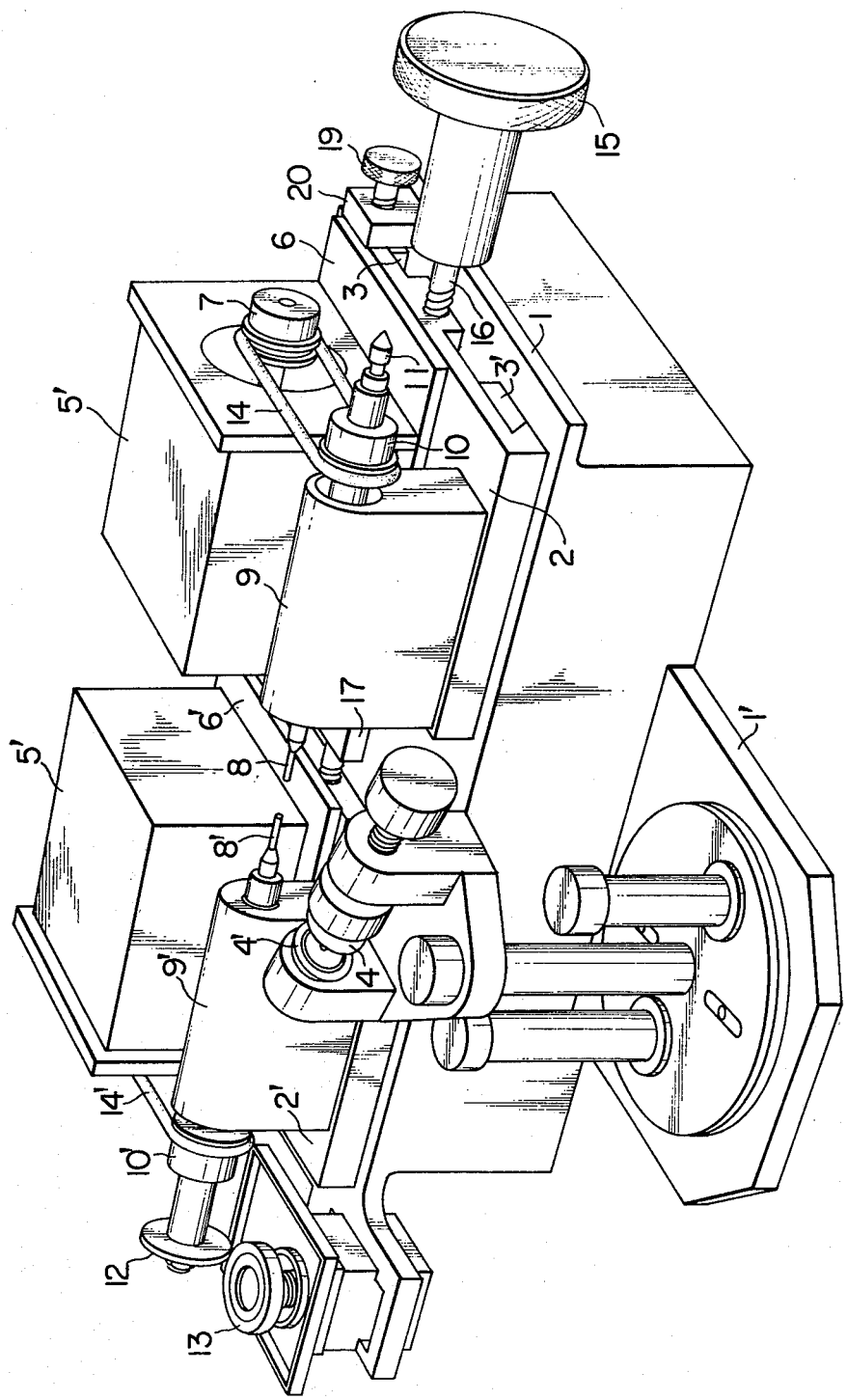

United States Patent [19]

Akaba et al.

[11] 4,163,622
[45] Aug. 7, 1979

[54] DRILLING MACHINE

[75] Inventors: Hayao Akaba, Akishima; Takuzo Takeuchi, Fussa, both of Japan

[73] Assignee: Hoya Lens Corporation, Tokyo, Japan

[21] Appl. No.: 846,039

[22] Filed: Oct. 27, 1977

[30] Foreign Application Priority Data

Oct. 29, 1976 [JP] Japan .................................. 51/130290

[51] Int. Cl.² ...................... B23B 39/22; B23B 41/00
[52] U.S. Cl. .......................................... 408/27; 408/25; 408/41; 408/145
[58] Field of Search ....................... 408/32, 27, 40, 41, 408/38, 24, 25, 145

[56] References Cited

U.S. PATENT DOCUMENTS

| | | | |
|---|---|---|---|
| 1,294,779 | 2/1919 | Demers et al. | 408/27 |
| 2,077,266 | 4/1937 | Rochte | 408/27 |
| 2,321,822 | 6/1943 | Kendis | 408/40 |
| 2,620,687 | 12/1952 | Jones et al. | 408/40 |
| 2,941,338 | 6/1960 | Santschi | 408/40 |
| 2,978,846 | 4/1961 | Barron | 408/145 |

Primary Examiner—Leonidas Vlachos
Attorney, Agent, or Firm—Jay L. Chaskin

[57] ABSTRACT

A drilling machine comprising an article holding device and two drilling devices, being characterized that each drilling device has one drill turning in the same direction at a synchronized speed, each drill approaching to or separating from each other symmetrically to make a hole from both sides of a rigid and fragile article made of glass or ceramic e.g. lenses of spectacles at the same time, and that the hole is chamfered and further a groove for fixing the article to the frame is made on the article, as required.

5 Claims, 8 Drawing Figures

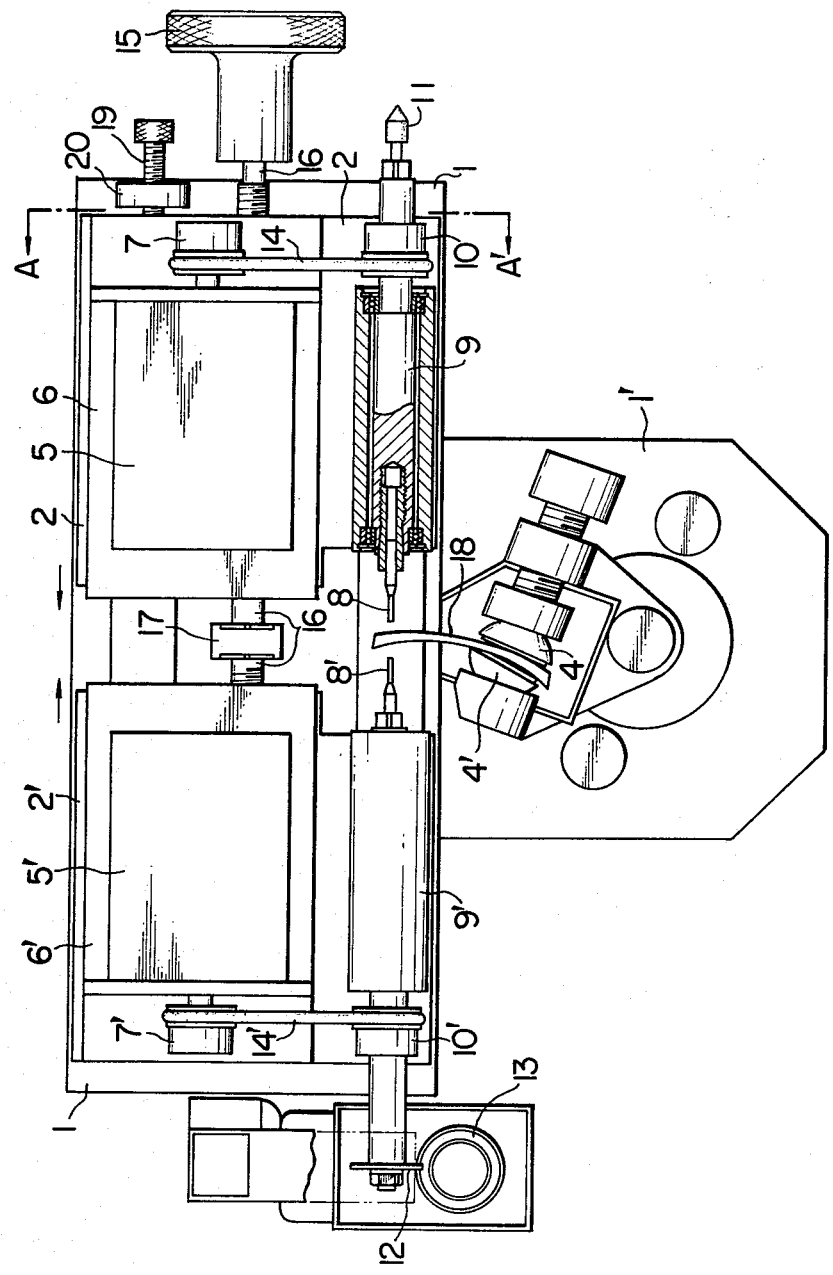

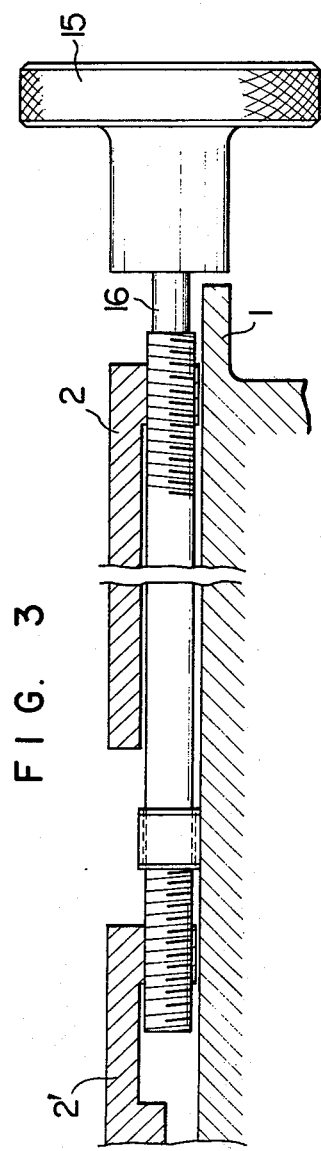
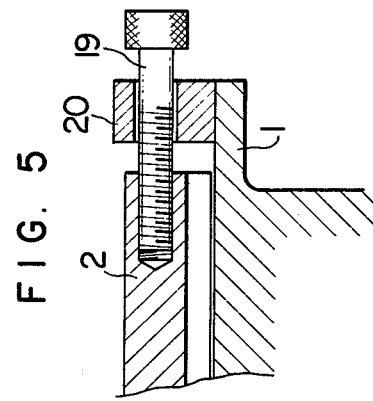
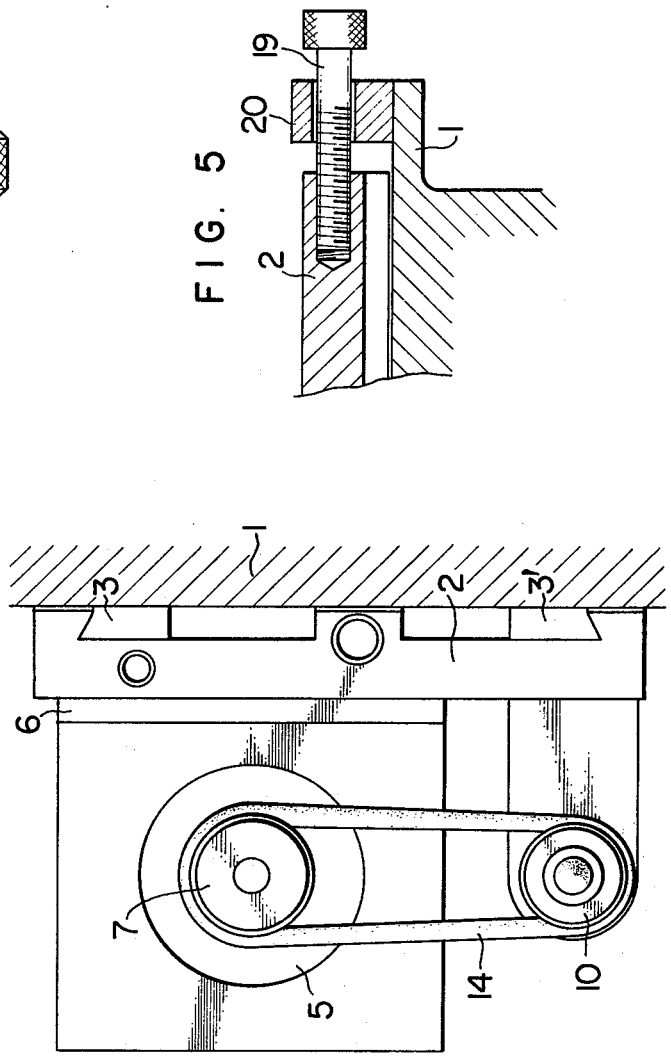

DRILLING MACHINE

The present invention relates to a drilling machine and more particularly to an apparatus for drilling on a rigid and fragile article made of glass or ceramic, e.g. lenses of spectacles.

Heretofore, a conventional drilling machine has been used for making a hole on a rigid and fragile article made of glass or ceramic, e.g. lenses of spectacles (hereinafter referred to as the lens), in order to combine it with other article. However, in such method, the periphery of the outlet of the hole was easily to be cracked and thus the marketing value of the lens as the merchandise was reduced. Further, it took a long time for drilling it.

Therefore, in order to prevent such damage, the hole was firstly made to the half of the thickness of the lens in one side by a drilling machine, and after the drill was pulled out, the lens was turned over, and after the center of the hole was visually aligned with the drill center, the hole was drilled to the half of the thickness from the other side of the lens to perforate through whole thickness.

However, in the operation in the conventional drilling machine, it was required for the operator to have a high level of skill, the yield rate being very low and further it took a long time for drilling the lens.

Furthermore, since the conventional drilling machine had no chamfering grindstone for the hole and no device for making the groove for the frame hook, further special manual labor was required for chamfering of the hole and making the groove.

An object of the present invention is to provide an apparatus for drilling a hole very easily accurately and quickly with superior finish without having any above mentioned disadvantages.

In order to achieve the object, a drilling machine according to the present invention comprises an article holding device and two drilling devices, being characterized that each of the drilling devices has one drill turned to the same direction at a synchronized speed and each drill is adapted to approach to or separate from each other symmetrically to make a hole from both sides of an article simultaneously.

Further, if necessary, the drilling machine includes a chamfering grindstone at the outer end of the drill turning shaft in one of the drilling devices for chamfering of the hole, a diamond cutter at the outer end of the drill turning shaft in other drilling device and an article supporting table on the base under the diamond cutter for making grooves for the frame hooks on the holed article.

The objects, constitution, features and advantages of the apparatus according to the present invention will be best understood from the following description accompanying with drawings.

Figure 6:
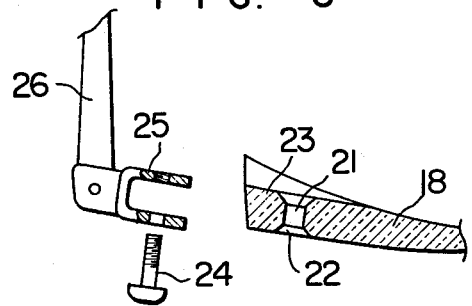
Figure 7:
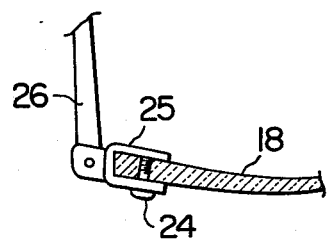
Figure 8:
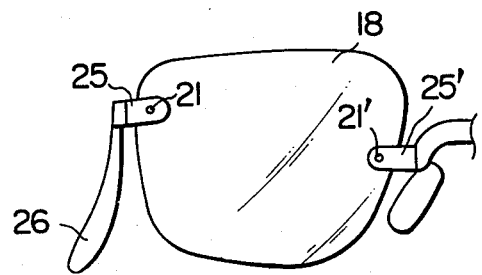

FIG. 1 is a perspective view showing the apparatus according to the present invention, FIG. 2 is a plan view of the apparatus according to the present invention, FIG. 3 is a sectional side view of a handle device of the apparatus according to the present invention, FIG. 4 is a sectional side view taken along the line A—A' in FIG. 2, FIG. 5 is a sectional side view of a stopper device, and FIGS. 6, 7 and 8 are schematic diagrams showing the relation between a frame and a lens drilled by the apparatus according to the present invention.

Embodiments of the invention will be described in detail as follows.

In the drawings, two slide tables 2, 2' slide on the surface of the base 1 along guide rails 3, 3' fixed thereto, and approach to or separate from each other symmetrically with respect to a feed screw holder 17 fixed to the center of the surface of the base 1.

Two motors 5, 5' are respectively fixed on the tables 6, 6' mounted on the slide tables 2, 2'. Two drilling devices 9, 9' also are fixed on the slide tables 2, 2' in a pair with the motors 5, 5' respectively.

A feed screw 16 has a handle 15 at the right end thereof and is screwed in the feed screw holder 17 for moving the table 2, 2'. Right-handed thread is made on one side of the holder 17 on the screw 16 and left-handed thread is made on other side of the holder 17 on the screw 16 respectively, with respect to the center of the holder 17.

Further, the one side of the screw 16 is screwed in the slide table 2' in right-handed screw turning pair and the other side of the screw 16 is screwed in the slide table 2 in left-handed screw turning pair.

When the handle 15 is turned clockwise manually, therefore, the slide tables 2, 2' approach to each other toward the screw holder 17 symmetrically, while when the handle 15 is turned counterclockwise, the slide tables 2, 2' separate from each other symmetrically with respect to the holder 17. As a result, the two pairs of motors and drilling devices 5, 9; 5', 9' approach to or separate from each other symmetrically by the turning of the handle 15.

Drills 8, 8' are equipped on the same center line at the inner ends of the turning shaft of the drilling devices 9, 9'. The pulleys 10, 10' fitted up on each turning shaft of the drilling devices 9, 9' are connected rotatably with the pulleys 7, 7' of the motor devices 5, 5' respectively by means of belts 14, 14'.

Since the motors of the motor devices 5, 5' are designed to drive in the same direction at a synchronized speed, the drills 8, 8' of the drilling devices are also turned in the same direction at a synchronized speed.

The holding devices 4, 4' are equipped on the base 1' rotatably and movably vertically by a knob, and hold the lens 18 to align its predetermined part to be drilled with the concentrical line of the drills 8, 8'.

It should be especially noted that no damage of the drills and the lens are produced even if the ends of the drills contact with each other after a hole is drilled through, since the drills are turned in the same direction at a synchronized speed.

Further, if necessary, a chamfering grindstone 11 for the hole can be equipped at the outer end of the shaft of the drill 8 of the drilling device 9, so that after making the holes 21, 21' of the lens 18, chamfering 22 of the holes can be effected, by holding the lens 18 detached from the drilling devices 9, 9', by hand, so as to make the lens closely contact with the head of the screw 24.

Further, a diamond cutter 12 can be equipped at the outer end of the shaft of the drill 8' of the drilling device 9' and a article holder 13, which is slidable laterally and movably vertically, can be equipped at the left end of the base 1 under the cutter 12, so that groove 23 for setting hooks 25, 25' to the lens 18 can be made in order to fix the lens 18 to the frame 26 after drilling of the holes 21, 21' or chamfering of the holes.

Thus, in the operation of the apparatus according to the present invention, firstly the lens 18, in which the holes 21, 21' are to be drilled, is held by the holding devices 4, 4', which are adjusted laterally or vertically to align the predetermined part to be drilled with the concentrical line of the right and left drills 8, 8'. After that, the drills 8, 8' are turned by driving the motors 5, 5' in the same direction at a synchronized speed.

Secondly the handle 15 is slowly turned clockwise manually, as described already, the drills 8, 8' approaching to each other and slowly encroaching into the lens 18 from each side respectively at a synchronized speed and the hole is drilled through when the drills 8, 8' contact with each other at the center of the thickness of the lens. The penetration of the hole can be ascertained by hand touch, visually, or by the operation of a stopper device. After the penetration of the hole, the motors 5, 5' are stopped to stop the drills 8, 8' turning.

After that, the handle 15 is turned counterclockwise manually so that the drills are moved away from each other to a predetermined position. Next, if necessary, the grindstone 11 for chamfering of the hole is turned to chamfer the holes 21, 21' of the lens 18, and the lens 18 is mounted on the article holder 13 to make the groove 23 for the hooks 25, 25' of the frame 26 by the diamond cutter 12.

Since the chamfering grindstone 11 and the diamond cutter 12 are equipped at the outer ends of the shafts of the drilling devices 9, 9' respectively, the rotation of them is identical with that of the drills 8, 8'.

Further, if a bolt 19 is passed through the stopper 20 fixed to the base 1, being screwed into the outer side of the slide table 2 and the interval between the stopper 20 and the head of bolt 19 is adjusted suitably, the interval is shortened when the slide tables 2, 2' approach inwardly to each other. Thus, when the head of the bolt touches the stopper, the slide tables 2, 2' stop and hence the drills 8, 8' are prevented from touching each other. In other words, the stopper device comprising the bolt 19 and the stopper 20 determines and regulates the stroke of the drills 8, 8'.

In the operation of the apparatus according to the present invention it is not required for the operator to have any high level skill and the drilling, chamfering or making of groove of the rigid and fragile article such as a lens, without regard to whether its surface is convex or concave, can be effected very easily, efficiently, safely, accurately without producing any damage and with a satisfactory finish. Therefore the drilling machine according to the present invention has great advantages and function over conventional machines.

Various modifications in structure and/or function may be made by one skilled to the disclosed embodiments without departing from the scope of the invention as defined by the claims.

What is claimed is:

1. A lens drilling machine comprising, in combination, a base for supporting first and second lens holding means, a table means for each of a pair of drilling means, the table means supporting the drilling means and being slidable on the base; each drilling means having a shaft gripping at one end thereof a drill in axial opposing alignment with the other drill and shaft and means for turning each drill in the same direction at a synchronized speed; the table means including means for permitting the drills to axially approach to or axially separate from each other symmetrically with respect to a lens fixedly supported by the first holding means in order to drill a hole completely through the lens from both sides of the lens simultaneously, at least one shaft having at an end opposite to the drill end a diamond cutter means for cutting a groove in the lens for fixing hooks to the lens and the second lens holding means being located immediately adjacent to the cutter means.

2. A lens drilling machine according to claim 1 comprising at least one shaft having at one end opposite to the drill end a grindstone for chamfering the hole drilled in the lens.

3. A lens drilling machine according to claim 2 comprising a stopper means for determining and regulating the stroke of the drilling means, the stopper means including a stopper fixed to the base and a bolt passed through the stopper and screwed into the slide table.

4. A lens drilling machine according to claim 1 wherein the table means includes a feed means in screw engagement with and extending through each slide table, a first portion of the feed means in screw engagement with one slide table having screw threads in a right-hand direction and a second portion of the feed means in screw engagement with the other slide table having screw threads in a left-hand direction.

5. A lens drilling machine according to claim 1, comprising a stopper means for determining and regulating the stroke of the drilling means, the stopper means including a stopper fixed to the base and a bolt passed through said stopper and screwed into the slide table.

* * * * *